(12) United States Patent
Pan et al.

(10) Patent No.: US 6,646,842 B2
(45) Date of Patent: Nov. 11, 2003

(54) INRUSH CURRENT SUPPRESSION CIRCUIT

(75) Inventors: Kuang-Hua Pan, Taoyuan Shien (TW); Chih-Ming Hsu, Taoyuan Shien (TW)

(73) Assignee: Delta Electronics, Inc. (TW)

( * ) Notice: Subject to any disclaimer, the term of this patent is extended or adjusted under 35 U.S.C. 154(b) by 62 days.

(21) Appl. No.: 10/097,497

(22) Filed: Mar. 14, 2002

(65) Prior Publication Data

US 2003/0107859 A1 Jun. 12, 2003

(30) Foreign Application Priority Data

Dec. 6, 2001 (TW) ....................... 90130261 A

(51) Int. Cl.⁷ ................................ H02H 9/00
(52) U.S. Cl. .................... 361/58; 361/18; 361/93; 361/111; 361/56; 323/222; 323/299; 363/53
(58) Field of Search ............... 361/58, 18, 93.9, 361/93, 111, 56, 101, 103, 59, 94; 363/53; 323/222

(56) References Cited

U.S. PATENT DOCUMENTS

| | | | | |
|---|---|---|---|---|
| 3,558,983 A | * | 1/1971 | Steen | 361/58 |
| 5,087,871 A | * | 2/1992 | Losel | 323/299 |
| 5,122,724 A | * | 6/1992 | Criss | 323/222 |
| 5,883,484 A | * | 3/1999 | Akao | 318/700 |
| 6,104,584 A | * | 8/2000 | Liu | 361/18 |

* cited by examiner

Primary Examiner—Anthony Dinkins
Assistant Examiner—Ha Nguyen
(74) Attorney, Agent, or Firm—Volpe and Koenig, P.C.

(57) ABSTRACT

An inrush current suppression circuit is installed between a DC voltage and a load with a parallel system capacitor. The inrush current suppression circuit includes a first current limiting circuit which includes a first resistor, a first controlled switch, and a second controlled switch. The inrush current suppression circuit further includes a second current limiting circuit which further includes a second resistor, a third controlled switch, and an energy-storing capacitor. The second current limiting circuit is electrically connected in parallel to the system capacitor, and the first current limiting circuit is electrically connected with the DC voltage and the second current limiting circuit. When the DC voltage is detected, the first controlled switch is conducted. When a voltage of two ends of the load reaches a first threshold value, the second controlled switch is conducted so as to bypass the first resistor. When a voltage of the energy-storing capacitor reaches a second threshold value, the third controlled switch is conducted so as to bypass the second resistor.

12 Claims, 6 Drawing Sheets

INRUSH CURRENT SUPPRESSION CIRCUIT

FIELD OF THE INVENTION

The present invention is related to an inrush current suppression circuit, and more particularly, to an inrush current suppression circuit of a power input module in a communication power system.

BACKGROUND OF THE INVENTION

An inrush current occurs frequently at the moment when the power starts up. At such a moment, an unpredictable and undesirable transient current happens. This may easily induce a noise, and even the power elements or the load could be damaged.

FIG. 1 shows an inrush current suppression circuit applied to a DC (direct current) power according to the prior art. A resistor R, a controlled switch SW, and an energy-storing capacitor C are electrically connected between an input DC voltage U and a system which includes a load and a parallel system capacitor Cs so as to limit the inrush current. At the beginning when the power of a power supply starts, the resistor R initially limits the current. Because the energy-storing capacitor does not begin to charge at this moment, the whole current is very large and thus may damage the components of the power supply. Subsequently, the capacitor is charged, and then the current is lowered. However, the value of current is still large, this making the resistor to produce heat continually. Finally, the controlled switch SW, such as a relay, is conducted to bypass the resistor R so as to avoid lowering the entire efficiency which is caused by the heat. One of the disadvantages of the prior art is that the relay, which endures to be conducted, is easily damaged. Moreover, at the moment when the relay is conducted, another type of inrush current is induced, this may damage the whole power supply.

SUMMARY OF THE INVENTION

It is an objective of the present invention to provide an inrush current suppression circuit for safely and stably suppressing the inrush current by means of soft turned-on.

It is another objective of the present invention to provide an inrush current suppression circuit where the energy consumption between the input voltage and load is low, so that it can be applied to those equipments, such as a network system, which consume low power.

According to a preferred embodiment of the present invention, the inrush current suppression circuit is installed between a DC voltage and a load with a parallel system capacitor. The inrush current suppression circuit includes a first current limiting circuit which includes a first resistor, a first controlled switch, and a second controlled switch in which the first controlled switch and the first resistor are electrically connected in series, and the second controlled switch is electrically connected in parallel to the first controlled switch and the first resistor. The inrush current suppression circuit further includes a second current limiting circuit which further includes a second resistor; a third controlled switch; and a energy-storing capacitor in which the second resistor and the capacitor are electrically connected in series, the second resistor is electrically connected in parallel to the third controlled switch. The second current limiting circuit is electrically connected in parallel to a system capacitor, and the first current limiting circuit is electrically connected with the DC voltage and the second current limiting circuit. When the DC voltage is detected, the first controlled switch is conducted. When the voltage of two ends of the load reaches a first threshold value, the second controlled switch is conducted so as to bypass the first resistor. When a voltage of the energy-storing capacitor reaches a second threshold value, the third controlled switch is conducted so as to bypass the second resistor.

Preferably, the load is a DC—DC converter.

Preferably, the first controlled switch is selected from a group consisting of a relay, a bipolar transistor, and a MOSFET (metal-oxide-semiconductor field-effect transistor).

Preferably, the second controlled switch is a MOSFET.

Preferably, the third controlled switch is a MOSFET.

Preferably, the first threshold value is from 30% to 80% of the DC voltage.

Preferably, the first threshold value is from 50% to 70% of the DC voltage.

Preferably, the second threshold value is from 70% to 100% of the DC voltage.

Preferably, the second threshold value is from 80% to 100% of the DC voltage.

Preferably, the second controlled switch is soft turned-on.

Preferably, the third controlled switch is soft turned-on.

According to another preferred embodiment of the present invention, the inrush current suppression circuit is installed between a DC voltage and a load with a parallel system capacitor. The inrush current suppression circuit includes a first current limiting circuit which further includes a first resistor, a first controlled switch, and a second controlled switch in which the first controlled switch and the first resistor are electrically connected in series, and the second controlled switch is electrically connected in parallel to the first controlled switch and the first resistor. The inrush current suppression circuit further includes a second current limiting circuit which further includes a second resistor; a third controlled switch; and a energy-storing capacitor in which the second resistor and the capacitor are electrically connected in series, the second resistor is electrically connected in parallel to the third controlled switch. The second current limiting circuit is electrically connected in parallel to a system capacitor, and the first current limiting circuit is electrically connected with the DC voltage and the second current limiting circuit. When the DC voltage is detected, the first controlled switch is conducted. When the voltage of two ends of the load reaches a first threshold value, the second controlled switch is soft turned-on so as to bypass the first resistor. When a voltage of the energy-storing capacitor reaches a second threshold value, the third controlled switch is soft turned-on so as to bypass the second resistor.

Now the foregoing and other features and advantages of the present invention will be more clearly understood through the following descriptions with reference to the drawings, wherein:

DETAILED DESCRIPTION OF THE PREFERRED EMBODIMENT

Figure 1:
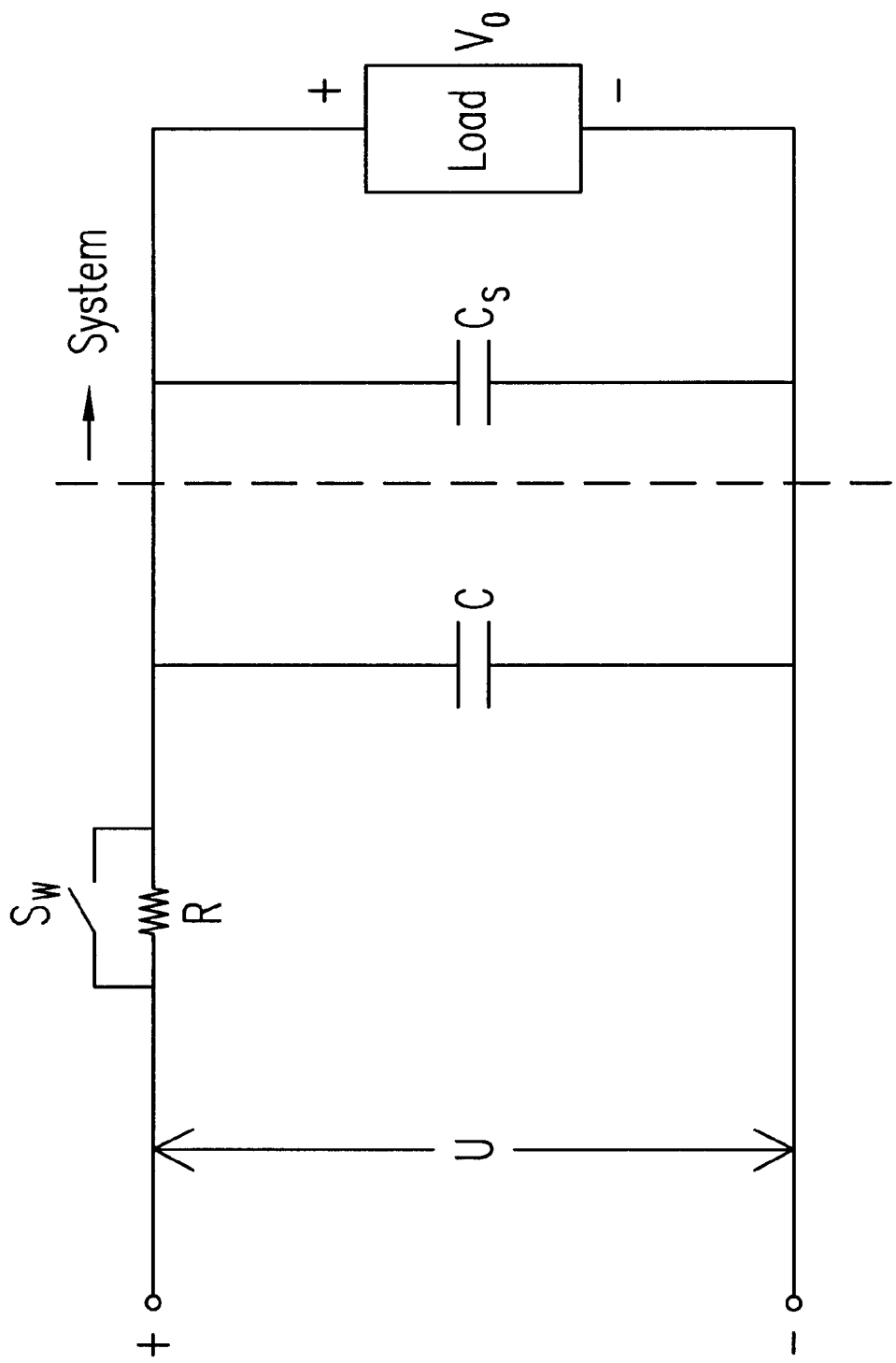
FIG. 1 shows an inrush current suppression circuit applied to a DC power according to the prior art.
Figure 2:
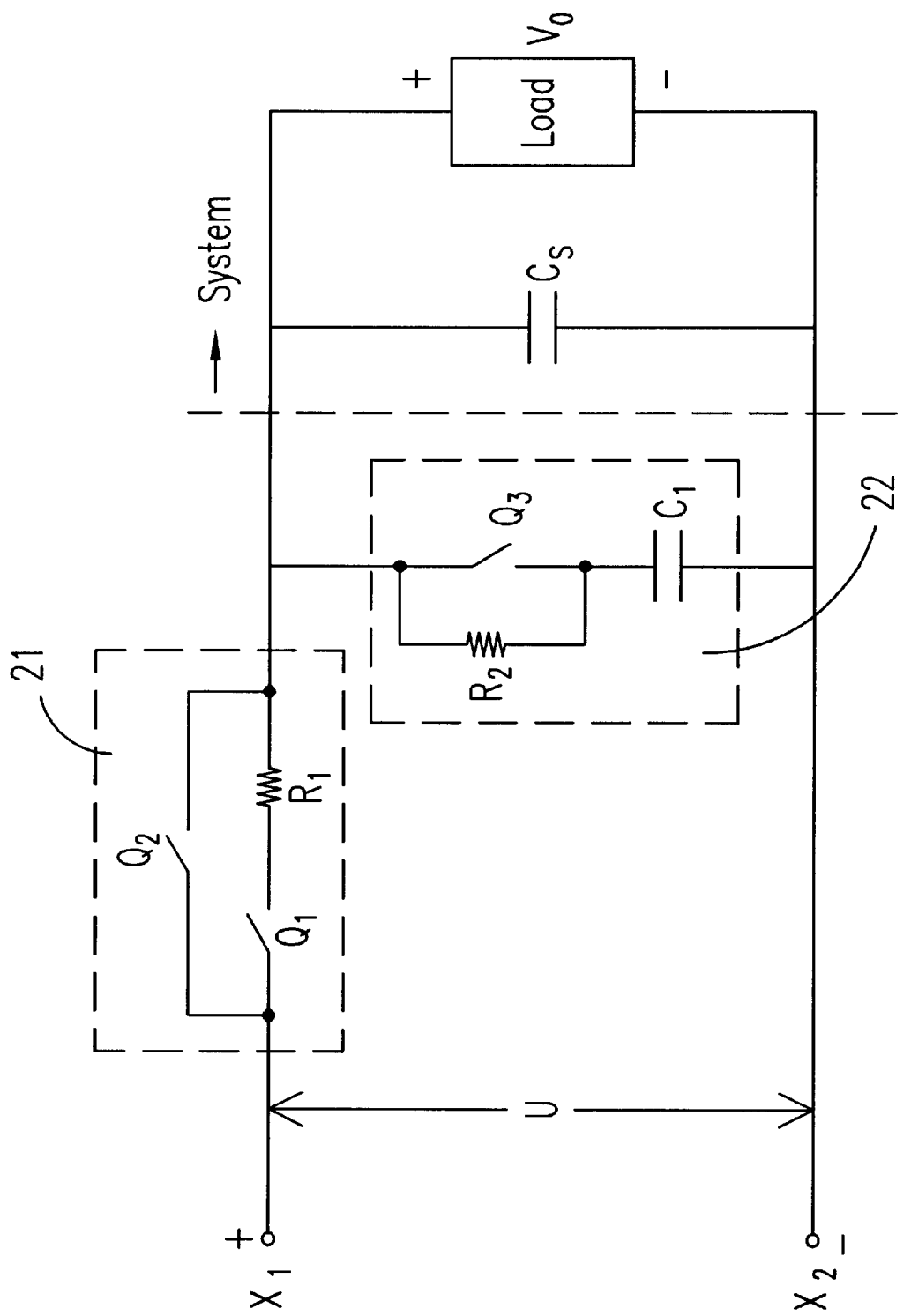
FIG. 2 shows an inrush current suppression circuit according to the preferred embodiment of the present invention.

Please refer to FIG. 2. The inrush current suppression circuit is installed between a DC voltage U and a system capacitor Cs of a load. By means of two resistors R1 and R2, three controlled switches Q1, Q2, and Q3, and one energy-storing capacitor C1, an inrush current can be suppressed. The inrush current suppression circuit according to the present invention includes a first current limiting circuit 21 and a second current limiting circuit 22. The first current limiting circuit 21 includes a first resistor R1, a first controlled switch Q1, and a second controlled switch Q2 in which the first controlled switch Q1 and the first resistor R1 are electrically connected in series, and the second controlled switch Q2 is electrically connected in parallel to the first controlled switch Q1 and the first resistor R1. The second current limiting circuit 22 includes a second resistor R2, a third controlled switch Q3, and an energy-storing capacitor C1 in which the second resistor R2 and the energy-storing capacitor C1 are electrically connected in series, and the second resistor R2 is electrically connected in parallel to the third controlled switch Q3. The second current limiting circuit 22 is electrically connected in parallel to a system capacitor Cs, and the first current limiting circuit 21 is electrically connected with the input end X1 of the DC voltage and the second current limiting circuit 22.

According to the present invention, the controlled switches Q2 and Q3 are preferably a MOSFET (metal-oxide-semiconductor field-effect transistor). The controlled switch Q1 may be a relay, a bipolar transistor, or a MOSFET.

According to the present invention, the load may be an electronic equipment, such as a modem, a printer, a notebook, or a DC—DC converter, wherein the DC—DC converter is preferred. FIGS. 3(A) to 3(D) show the operating mechanism of the inrush current suppression circuit according to the present invention.

Figure 3A:
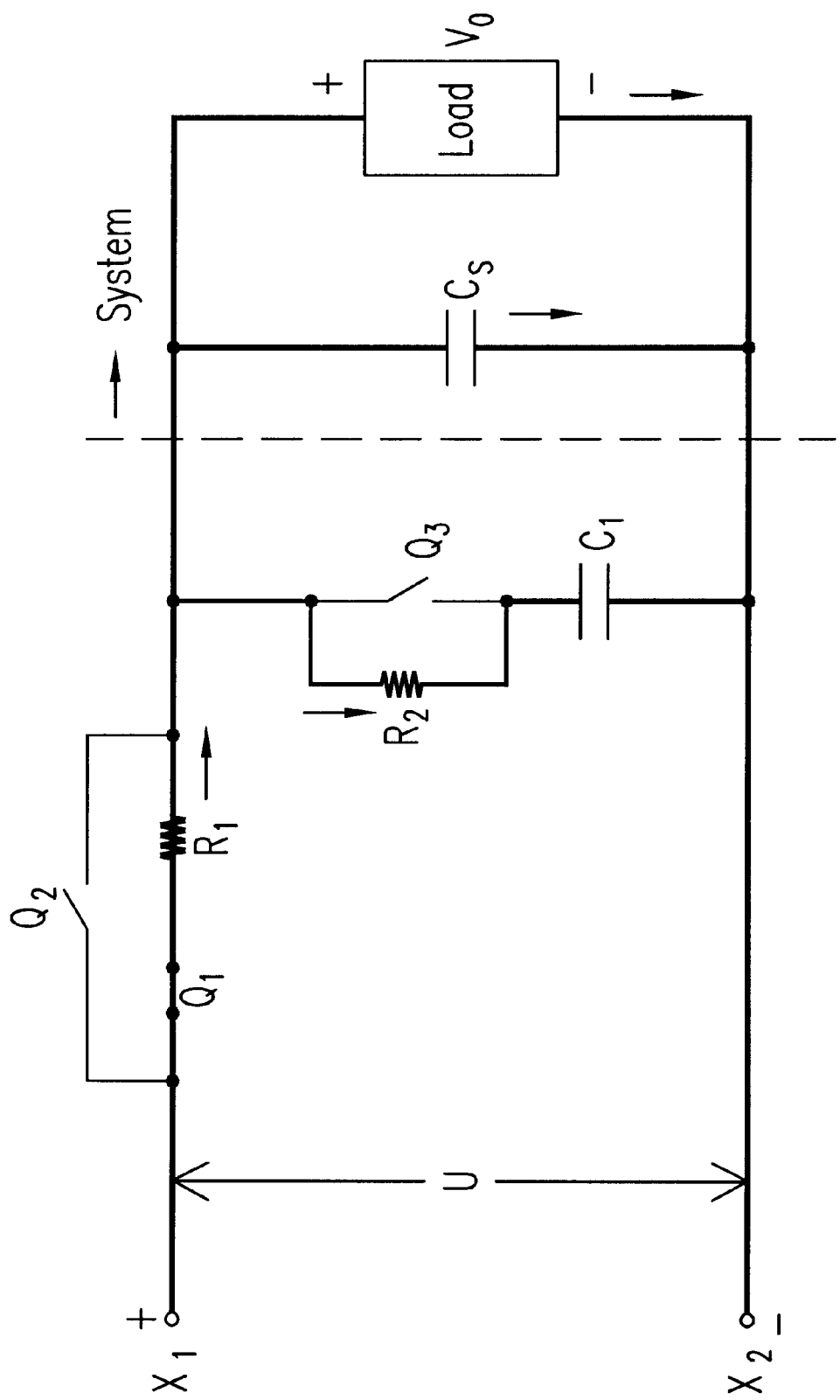
FIGS. 3(A), 3(B), 3(C), 3(D) show the operating mechanism of the inrush current suppression circuit according to the present invention.

Please refer to FIG. 3(A). When the DC voltage is detected, the first controlled switch Q1 is conducted, while the second controlled switches Q2 and Q3 are still open. In this condition, a current is limited by the first resister R1 and the second resister R2. Because the current flowing through the resisters R1, R2, and the energy-storing capacitor C1 according to the present invention is less than the current flowing through the resister R1 according to the prior art, the heat produced by the resisters is smaller. Consequently, the serving life of the energy-storing capacitor C1 is longer.

Figure 3B:
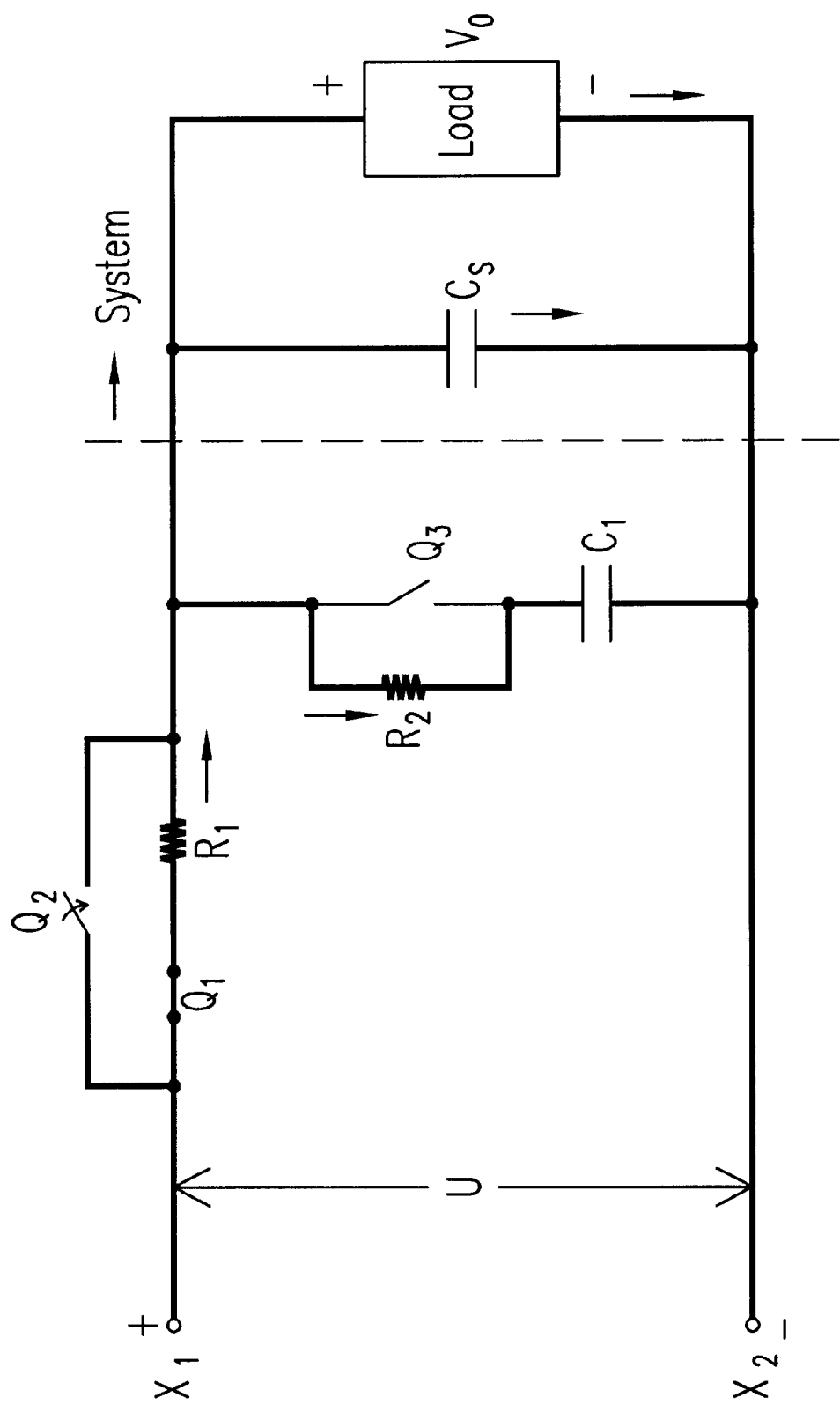

Please refer to FIG. 3(B). When the voltage $V_0$ of two ends of the load, or of two ends of the system capacitor Cs, reaches a first threshold value, the second controlled switch Q2 is soft turned-on which means the switch is conducted with a constant slop with respect to time. Thus, an inrush current, induced by a rushed close of a relay according to the prior art, can be avoided. After the second controlled switch Q2 is completely conducted, the first resistor R1 is then bypassed so as to reduce the whole power consumption. At the same time, the energy-storing capacitor has been charged to a certain level so that the current flowing through the second resistor R2 is lowered. Preferably, the first threshold value is from 30% to 80% of the DC voltage U. More preferably, the first threshold value is from 50% to 70% of the DC voltage U.

Figure 3C:
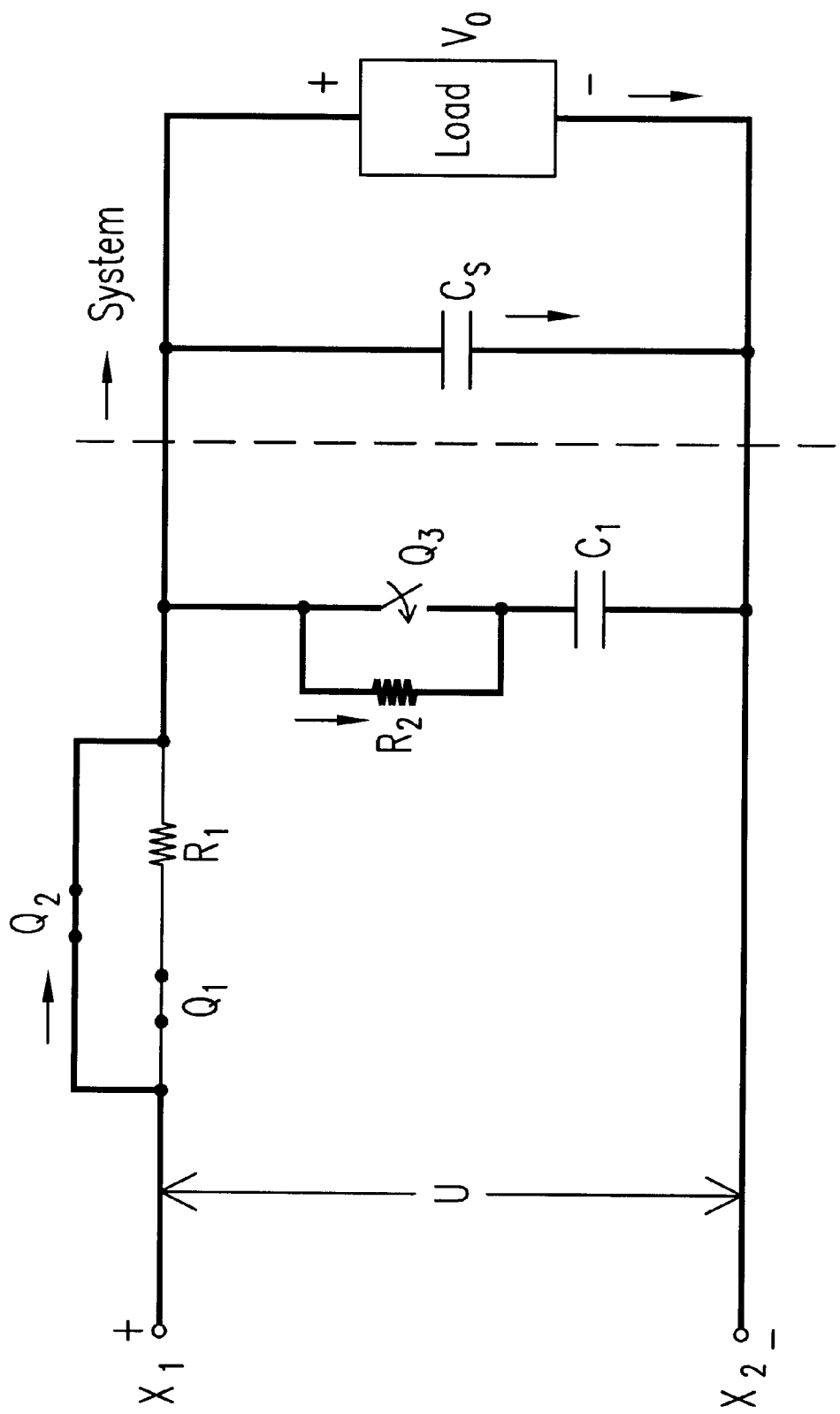
Figure 3D:
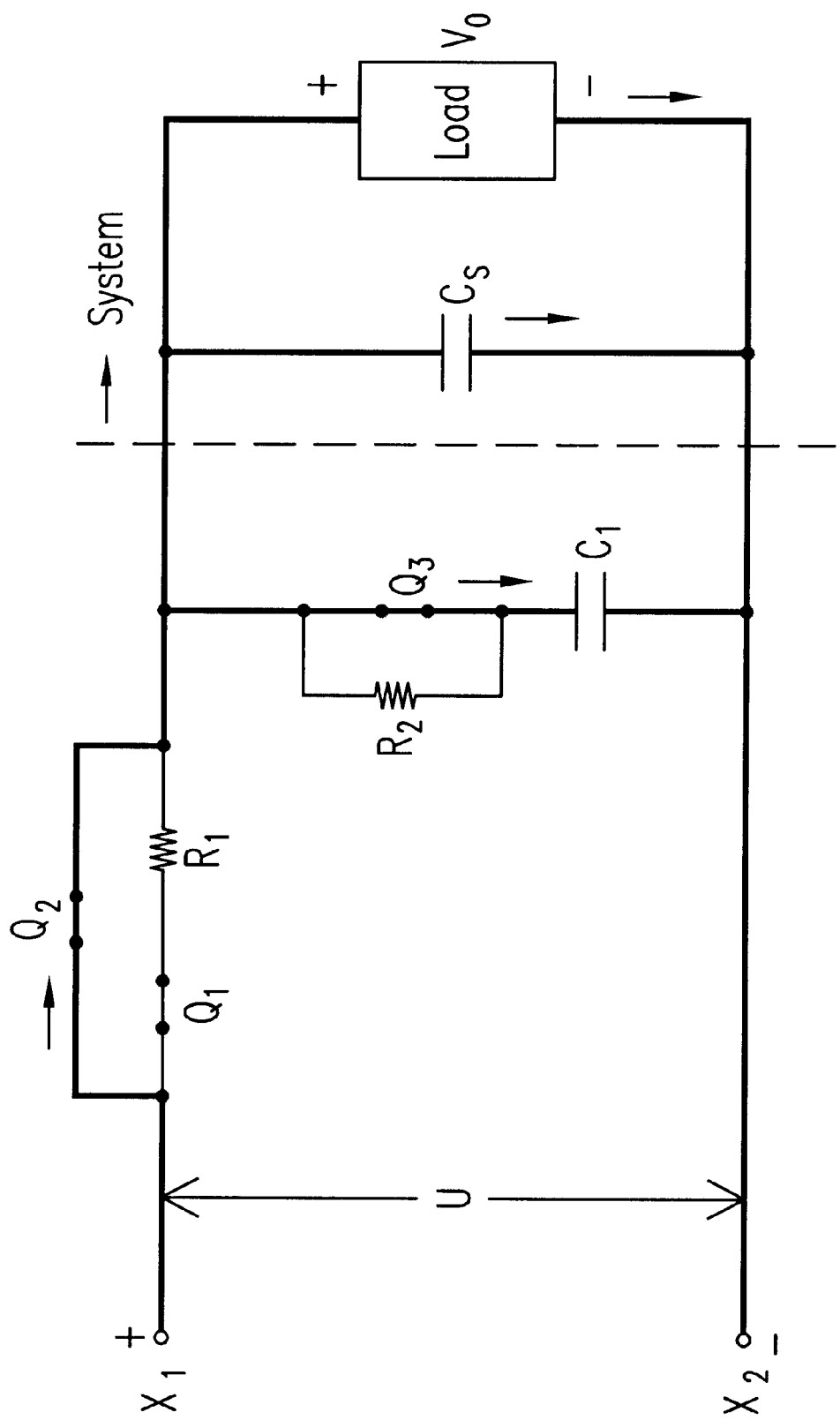

Please refer to FIG. 3(C). When a voltage of the energy-storing capacitor reaches a second threshold value, the third controlled switch Q3 is soft turned-on. After the third controlled switch Q3 is completely conducted, the second resistor R2 is then bypassed so as to reduce the whole power consumption, as shown in FIG. 3(D). Preferably, the second threshold value is from 70% to 100% of the DC voltage U; more preferably, the second threshold value is from 80% to 100% of the DC voltage U; and most preferably, the second threshold value is the DC voltage U.

In sum, the present invention uses two resistors R1 and R2, three controlled switches Q1, Q2, and Q3, and one energy-storing capacitor C1 to suppress an inrush current by slowly starting the system. Accordingly, the present invention can rectify the drawbacks of the prior art and is practicable, novel, and progressive.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. An inrush current suppression circuit installed between a DC voltage and a load with a parallel system capacitor comprising:
    a first current limiting circuit comprising:
        a first resistor;
        a first controlled switch; and
        a second controlled switch wherein said first controlled switch and said first resistor are electrically connected in series, and said second controlled switch is electrically connected in parallel to said first controlled switch and said first resistor; and
    a second current limiting circuit comprising:
        a second resistor;
        a third controlled switch; and
        an energy-storing capacitor wherein said second resistor and said energy-storing capacitor are electrically connected in series, said second resistor is electrically connected in parallel to said third controlled switch, said second current limiting circuit is electrically connected in parallel to said system capacitor, and said first current limiting circuit is electrically connected with said DC voltage and said second current limiting circuit,
        whereby, when said DC voltage is detected, the first controlled switch is conducted; when a voltage of two ends of said load reaches a first threshold value, said second controlled switch is conducted so as to bypass said first resistor; and when a voltage of said energy-storing capacitor reaches a second threshold value, said third controlled switch is conducted so as to bypass said second resistor.

2. The inrush current suppression circuit as claimed in claim 1, wherein said load is a DC—DC converter.

3. The inrush current suppression circuit as claimed in claim 1, wherein said first controlled switch is selected from a group consisting of a relay, a bipolar transistor, and a MOSFET (metal-oxide-semiconductor field-effect transistor).

4. The inrush current suppression circuit as claimed in claim 1, wherein said second controlled switch is a MOSFET.

5. The inrush current suppression circuit as claimed in claim 1, wherein said third controlled switch is a MOSFET.

6. The inrush current suppression circuit as claimed in claim 1, wherein said first threshold value is from 30% to 80% of the DC voltage.

7. The inrush current suppression circuit as claimed in claim 6, wherein said first threshold value is from 50% to 70% of the DC voltage.

8. The inrush current suppression circuit as claimed in claim 1, wherein said second threshold value is from 70% to 100% of the DC voltage.

9. The inrush current suppression circuit as claimed in claim 8, wherein said second threshold value is from 80% to 100% of the DC voltage.

10. The inrush current suppression circuit as claimed in claim 1, wherein said second controlled switch is soft turned-on.

11. The inrush current suppression circuit as claimed in claim 1, wherein said third controlled switch is soft turned-on.

12. An inrush current suppression circuit installed between a DC voltage and a load with a parallel system capacitor comprising:
   a first current limiting circuit comprising:
      a first resistor;
      a first controlled switch; and
      a second controlled switch wherein said first controlled switch and said first resistor are electrically connected in series, and said second controlled switch is electrically connected in parallel to said first controlled switch and said first resistor; and
   a second current limiting circuit comprising:
      a second resistor;
      a third controlled switch; and
      an energy-storing capacitor wherein said second resistor and said energy-storing capacitor are electrically connected in series, said second resistor is electrically connected in parallel to said third controlled switch, said second current limiting circuit is electrically connected in parallel to said system capacitor, and said first current limiting circuit is electrically connected with said DC voltage and said second current limiting circuit,
      whereby, when said DC voltage is detected, the first controlled switch is conducted; when a voltage of two ends of said load reaches a first threshold value, said second controlled switch is soft turned-on so as to bypass said first resistor; and when a voltage of said energy-storing capacitor reaches a second threshold value, said third controlled switch is soft turned-on so as to bypass said second resistor.

* * * * *